(12) United States Patent
Dornier, II et al.

(10) Patent No.: US 6,755,701 B2
(45) Date of Patent: Jun. 29, 2004

(54) AMPHIBIOUS VEHICLE WITH SUBMERSIBLE CAPACITY

(75) Inventors: Jules A. Dornier, II, Thibodaux, LA (US); John M. Wilson, Sr., Harvey, LA (US); Dean R. Wilson, Marrero, LA (US)

(73) Assignee: Wilco Marsh Buggies and Draglines, Inc., Harvey, LA (US)

( * ) Notice: Subject to any disclaimer, the term of this patent is extended or adjusted under 35 U.S.C. 154(b) by 21 days.

(21) Appl. No.: 10/151,135

(22) Filed: May 20, 2002

(65) Prior Publication Data

US 2003/0216092 A1 Nov. 20, 2003

(51) Int. Cl.$^7$ ............................................. B63H 19/00
(52) U.S. Cl. ........................................... 440/36; 37/307
(58) Field of Search ......................... 40/36; 114/258, 114/313, 322; 37/307, 313, 320, 332, 345; 440/36

(56) References Cited

U.S. PATENT DOCUMENTS

| | | | |
|---|---|---|---|
| 1,356,773 A | * 10/1920 | Lake ........................... 405/192 |
| 3,755,932 A | 9/1973 | Cargile, Jr. .................... 37/67 |
| 3,962,803 A | 6/1976 | O'Brien .......................... 37/66 |
| 4,000,532 A | 1/1977 | Nielsen ........................... 9/8 R |
| RE29,167 E | 4/1977 | Lloyd, III .................... 114/264 |
| 4,091,760 A | 5/1978 | Lloyd, III .................... 114/264 |
| 4,166,426 A | 9/1979 | Lloyd, III ................. 114/65 R |
| 4,356,785 A | 11/1982 | Bailie .......................... 114/264 |
| 4,541,927 A | 9/1985 | Breidenbaugh ............. 210/122 |
| 4,626,132 A | 12/1986 | Allen ........................... 405/71 |
| 4,676,052 A | 6/1987 | Hawk ............................... 56/8 |
| 4,680,879 A | 7/1987 | Hill et al. ....................... 37/67 |
| 4,702,023 A | 10/1987 | McDowell ...................... 37/66 |
| 4,713,896 A | 12/1987 | Jennens ......................... 37/54 |
| 4,926,571 A | 5/1990 | Johannsen ...................... 37/72 |
| 4,942,682 A | 7/1990 | McDowell ...................... 37/66 |
| 4,999,934 A | 3/1991 | Hanson et al. ................. 37/66 |
| 5,060,404 A | 10/1991 | Lipford ......................... 37/64 |
| 5,146,699 A | 9/1992 | Lipford ......................... 37/57 |
| 5,172,497 A | 12/1992 | Lemonds et al. .............. 37/59 |
| 5,183,579 A | 2/1993 | Eller ........................... 210/776 |
| 5,199,193 A | 4/1993 | Akiba et al. .................. 37/341 |
| 5,203,099 A | 4/1993 | Naranjo et al. ............... 37/329 |
| 5,240,608 A | 8/1993 | Gurfinkel et al. ........... 210/319 |
| 5,249,378 A | 10/1993 | Frame .......................... 37/342 |
| 5,381,751 A | 1/1995 | Richards et al. ............. 114/264 |
| 5,782,660 A | 7/1998 | Brickell et al. ............... 440/36 |
| 5,791,074 A | 8/1998 | Pryor ........................... 37/345 |
| 5,824,231 A | 10/1998 | Blomberg ................... 210/776 |
| 5,934,827 A | 8/1999 | Kirby ........................... 405/21 |
| 5,970,634 A | 10/1999 | Dann et al. ................... 37/301 |
| 6,024,145 A | 2/2000 | Ackles ....................... 144/382 |

* cited by examiner

Primary Examiner—Jesus D. Sotelo
(74) Attorney, Agent, or Firm—Conley Rose, P.C.

(57) ABSTRACT

An amphibious vehicle with submersible capacity includes a first portion and a second portion, coupled by an extension, and a valve assembly. The first portion is capable of floating on water while the second portion is contemporaneously submerged beneath the surface and performing a variety of operations on the water's bottom. The valve assembly allows the vehicle to move between an amphibious mode and a submerged mode.

26 Claims, 5 Drawing Sheets

AMPHIBIOUS VEHICLE WITH SUBMERSIBLE CAPACITY

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Field of the Invention

An embodiment of the invention relates generally to an amphibious vehicle with submersible capacity and in particular to a vehicle comprised of a first portion and a second portion, coupled by an extension, and a valve assembly for quickly, simply, and economically converting the vehicle between an amphibious mode and a submerged mode. In the submerged mode, the first portion is capable of floating on the surface while the second portion is contemporaneously submerged beneath the surface and performing a variety of operations on the water's bottom.

Amphibious vehicles were first developed over 50 years ago primarily to support oil and gas exploration operations conducted in marshy or swampy terrain. Examples of such a vehicle are shown in U.S. Pat. No. 5,511,508 and U.S. Pat. No. 5,740,875, each of which is hereby incorporated herein by reference. Such vehicles typically include a pair of pontoons connected to a center platform. The pontoons are preferably constructed from steel or aluminum as rigid hollow structures or enclosures to provide sufficient buoyancy or "flotation" in amphibious environments to stabilize and support machinery even on marshy or swampy terrain. The pontoons are usually surrounded by a track system which is capable of engaging ground or land of the water or swamp to propel the vehicle. One or more endless chains are preferably driven by a sprocket, or other means, and surround each pontoon. The endless chains support the tracks and are guided along the outer surface of the pontoon by guide channels. The tracks are driven about the periphery of the pontoons in order to provide a thrust to the vehicle. By varying the amount and direction of thrust, or track travel, applied to each pontoon, the vehicle can be advanced, turned, or reversed.

The center platform is used to support machinery, typically including a boom crane. The amphibious vehicle also includes a drive system with a lower drive train. The drive system is used to independently rotate the tracks about their respective pontoons. The rotation of tracks is the primary method of positioning and guiding the amphibious vehicle. By varying the speed and direction of each track, the amphibious vehicle is able to advance, change course, or reverse.

Additionally, it is well-known in the art to mount a dredge on the vehicle and use the dredge having tools attached thereto such that the tools can be extended to the seabed. Examples of such a dredge are described in U.S. Pat. No. 4,676,052, U.S. Pat. No. 4,680,879, U.S. Pat, No. 5,146,699 and U.S. Pat. No. 6,024,145. Such dredges typically include a boom coupled to the hull of the amphibious vehicle. The boom is typically extendable and retractable and includes a tool attached to its leading end. It is further well known in the art to use a submersible vehicle along the water's bed. Such vehicles can be used to install and bury cables or pipes.

Still other prior art includes a mobile platform on the vehicle which is vertically extendable and retractable by a set of legs, as seen for example in U.S. Pat. No. 3,755,932 and No. 3,403,597 A1 and British Patent No. 1,212,172. However, such platforms lack the ability of being used in swampy or marshy terrain because the platforms do not generate sufficient low ground pressure to avoid becoming repeatedly stuck in the soft terrain.

SUMMARY OF THE INVENTION

An embodiment of the invention relates generally to an amphibious vehicle with submersible capacity and in particular to a vehicle comprising a surface portion and a submersible working portion coupled by an extension. The surface portion is capable of floating on the surface while the working portion is contemporaneously submerged beneath the surface and performing a variety of operations on the bottom. In one embodiment, the present invention comprises a surface portion in the form of a barge capable of floating on the surface of a body of water, a submersible working portion with pontoons capable of driving engagement with the bed of a body of water, an extension with upper and lower ends, and a valve assembly. The valve assembly allows quick, simple, and economic transition from an amphibious mode to a submerged mode, and vice versa.

The prior art does not include a system that allows quick, simple, and economical conversion between submerged work, floating work, and marsh/swamp work. The present invention overcomes this shortcoming. Specifically, the present invention expands the high mobility capability of the original concept of a pontoon based amphibious vehicle to economically also work as a submerged tool carrier, as a base for a tool floating on the surface of the water, or as a tool carrier in marsh or swamp lands to perform a diverse variety of submersible jobs, including pipeline laying, installing communication cable, power line construction work, and in environmental or remediation projects. The transformation between an amphibious mode and a submerged mode is accomplished quickly, simply, and economically by use of a valve assembly. In the amphibious mode, the present invention allows an operator to work in soft terrain environment with little water for floatation because the present invention generates low ground pressure. In the submerged mode, an operator can work at depths of up to approximately 300 ft of water.

Preferably, the invention involves a vehicle system which has at least three parts: a submersible portion configured to work as a high mobility track type amphibious vehicle with a valve system built therein to allow the unit to work submerged as required for a specific project; an umbilical device, either rigid or flexible, designed to convey power, communications, etc. to the submerged portion; and a floating portion arranged to be carried or towed by the submersible portion. Additionally, the valve built into the submerged portion is a multi-function valve which automatically allows water to flow in or out of the pontoons while the vehicle is operating in a submersible mode, and also keeps marine sediments and other foreign materials out of the internal areas on the pontoons. The valve also allows access to the interior of the pontoons and can be economically sealed or opened to quickly, simply, and economically convert the system between the amphibious mode and the submerged mode, or vice versa.

Thus, the invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the invention, reference will now be made to the accompanying drawings, wherein.

DETAILED DESCRIPTION OF A PREFERRED EMBODIMENT

Figure 2:
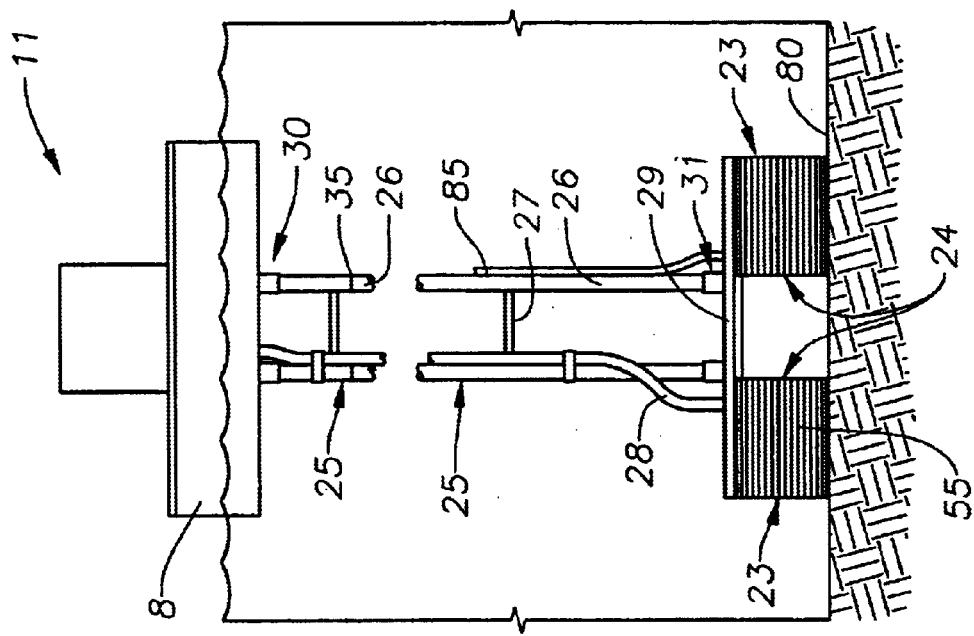
FIG. 2 shows a front view of the embodiment of amphibious vehicle the shown in FIG.
Figure 1:
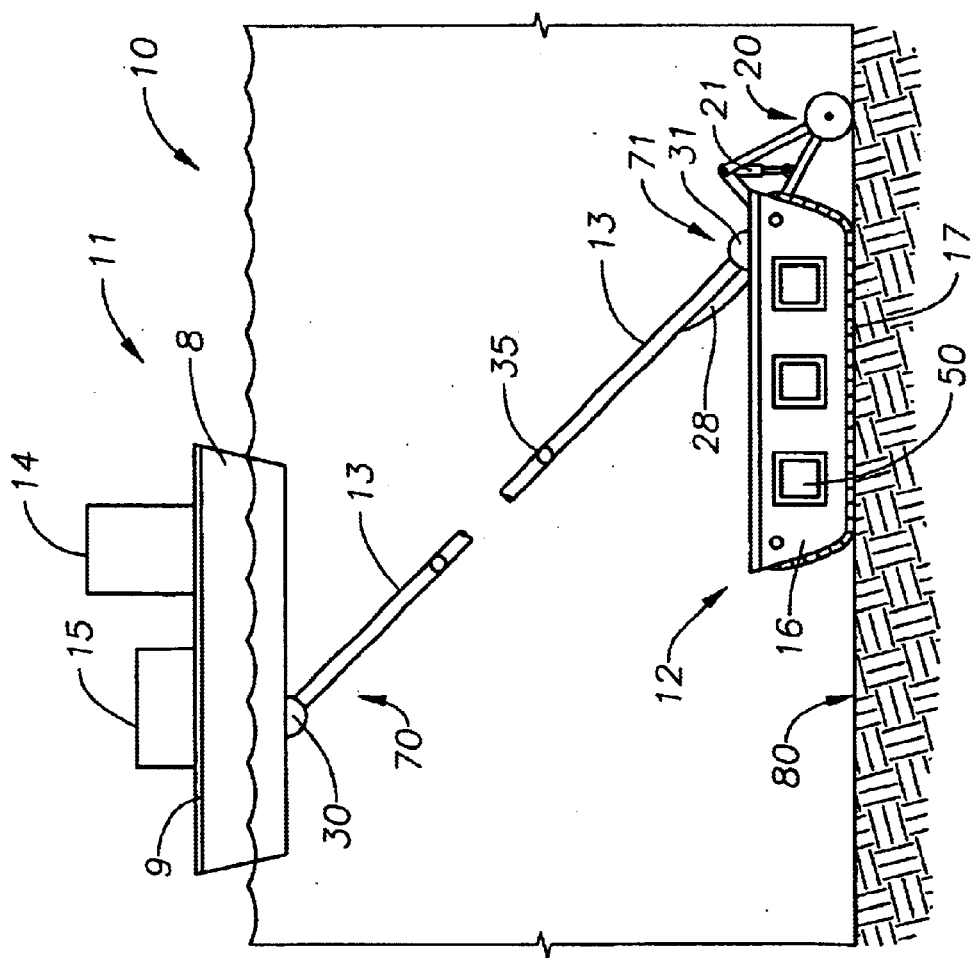
FIG. 1 shows a side view of an embodiment of an amphibious vehicle of the invention in the submerged mode.

Referring initially to FIGS. 1 and 2, the amphibious/submersible system 10 of the present invention is shown in the submerged mode. System 10 comprises a surface portion 11, a submersible portion 12, and an extension 13. Surface portion 11 includes a barge-like body 8 with a deck 9, a cab 14, and a power supply 15. Surface portion 11 is preferably made from a light weight material such as aluminum and is designed to be buoyant.

In a preferred embodiment, submersible portion 12 comprises a chassis 29 (shown best in FIG. 2), a pair of pontoons 16, and a track system 17. Chassis 29 couples pontoons 16. As used in this specification and the claims, the term "couple" or "couples" or any derivative thereof means either an indirect or direct connection. Thus, if a first device couples to a second device, that connection may be through a direct connection, or through an indirect connection via other devices and connections. One example of chassis 29 is found in U.S. Pat. No. 6,315,622, which is hereby incorporated herein by reference. Pontoons 16 are preferably constructed from steel, aluminum, or aluminum alloy as rigid hollow structures or enclosures and include outer side walls 23 and inner side walls 24. It is known in the art that pontoons 16 are designed to have low weight and low ground pressure (see U.S. Pat. No. 5,511,508).

Track system 17 generally includes an endless track which surrounds each pontoon 16 which includes a plurality of individual cleats 55. Cleats 55 can be of any type of cleat known in the art, including those described in U.S. Pat. No. 4,846,092, which is hereby incorporated herein by reference. Track system 17 is capable of driving engagement with water's bed 80 shown in FIGS. 1 and 2 or with the ground 90 shown in FIG. 8. Pontoons 16 preferably further include a plurality of valve assemblies 50. In a preferred embodiment, each of pontoons 16 includes three valve assemblies 50, as shown in FIG. 1. Valve assemblies 50 are preferably disposed on outer side walls 23 of pontoons 16.

Submersible portion 12 further includes a deck 19 and a tool 20. In one embodiment, tool 20 is coupled to submersible portion 12 via a hydraulic cylinder 21. Examples of tool 20 that may be used with the present invention are a jetter, a rockwheel cutter, a chain cutter, and a dredging attachment with submersible pump, all well known in the art. It will be appreciated that, although a single tool 20 is shown in FIG. 1, the present invention includes any means for performing various tasks including pipeline laying, installing communication cable, power line construction work, and environmental or remediation type projects. It will also be appreciated that, although tool 20 is shown on one end of submersible portion 12, the invention is not so limited and tool 20 can be located anywhere on portion 12. Further, it should be appreciated that a tool, such as tool 20, may be coupled to surface portion 11. This is particularly useful when system 10 is in the amphibious mode.

Still referring to FIG. 1, surface portion 11 and submersible portion 12 are coupled via extension 13. Extension 13 includes an arm or boom having an upper end 70 and lower end 71 and can be comprised of any structure, whether rigid or flexible, that connects surface portion 11 and submersible portion 12. Extension 13 can be actuated by the buoyancy force created by surface portion 11, i.e., when surface portion 11 begins to float extension 13 begins to extend. Alternatively, extension 13 can be extended by any other means, such as hydraulics or pneumatics.

Referring now to FIG. 2, in one embodiment, extension 13 may be in the form of a ladder. Ladder 25 includes two support members 26 and a plurality of braces 27. Ladder 25 is coupled to submersible portion 12 via link 31 and is coupled to surface portion 11 via link 30. Links 31, 30 can be any link known in the art, including but not limited to a pivot, ball hinged or universal joint. Additionally, depending on the length of ladder 25, a joint or plurality of joints 35 can be positioned to allow ladder 25 to extend and retract sectionally.

Figure 9:
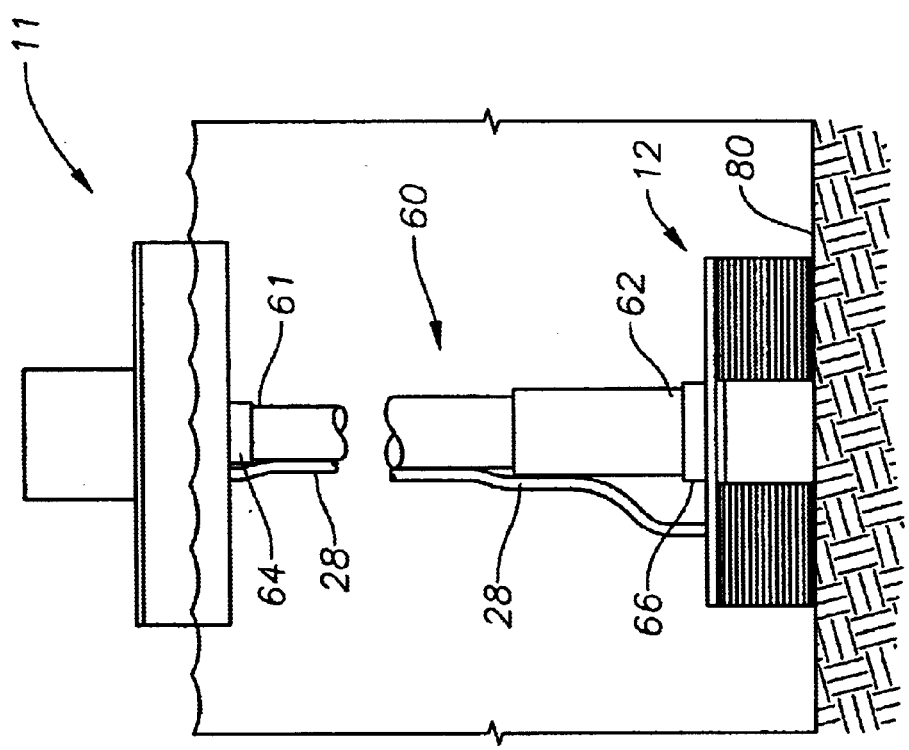
FIG. 9 shows a front view of an embodiment of the invention utilizing a telescoping extension.

Referring now to FIG. 9, in another embodiment, extension 13 may be a telescoping member, such as telescoping member 60. Telescoping member 60 has a first end 61 and a second end 62. Telescoping member 60 is coupled to surface portion 11 and submersible portion 12 via connectors 64, 66 respectively. Connectors 64, 66 can be any connector known in the art, including but not limited to a pivot or ball joint. Although telescoping member 60 is shown having a circular cross-section, the present invention is not so limited and the cross-section of the telescoping member 60 can be of any shape, including but not limited to rectangular, triangular, oval, hexagonal.

Figure 3:
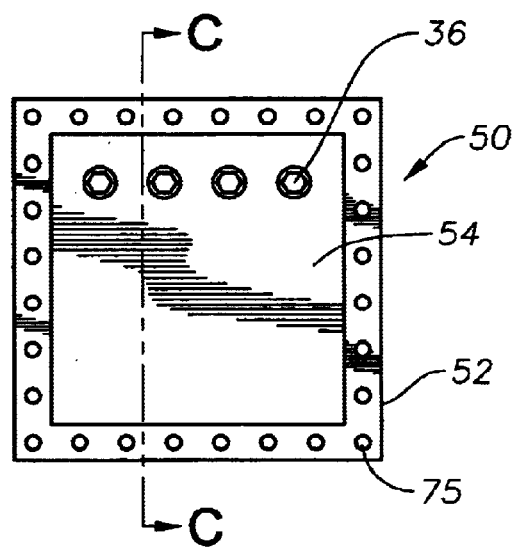
FIG. 3 shows an embodiment of the valve assembly of the invention.

Referring now to FIG. 3, there is shown a valve assembly 50. Each valve assembly 50 can take a variety of shapes, but preferably is rectangular. Valve assembly 50 includes a frame 52 and a vane 54. Preferably, each frame 52 is welded to outer side walls 23 of pontoons 16 and is made of stainless steel. Frame 52 has a thickness T and a plurality of threaded holes 75 therein. Thickness T is preferably approximately 1 inch, to provide structural support for valve assembly 50 and pontoons 16. Holes 75 preferably extend through frame 52 and are capable of alignment with holes (not shown) in outer side wall 23. Fasteners 44 can be disposed in holes 75 when system 10 is in the submerged mode. Preferably, vane 54 is disposed within frame 52, is made of ultra high molecular weight polyethylene (UHMW), and has a thickness X of one-half inch.

Figure 4:
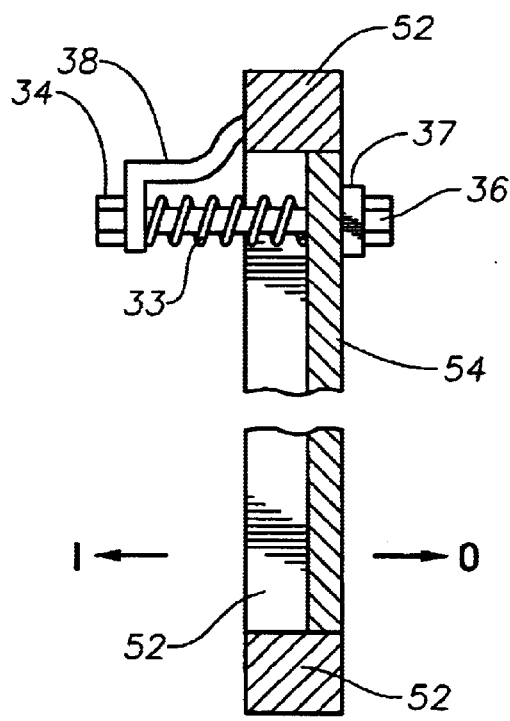
FIG. 4 shows a cross-sectional view of the embodiment of the valve assembly shown in FIG. 3 taken at plane C—C.

Referring now to FIG. 4, vane 54 is preferably coupled to frame 52 via springs 33, angle brackets 38, adjustable bolts 36, and flat bars 37. Lock nuts 34 may also be used to couple frame 52 to outer wall 23. Spring 33 is preferably a compression spring that allows the vane 54 to deflect. Spring 33 also allows vane 54 to align and retain close tolerance between vane 54 and frame 52. In the preferred embodiment, flat bar 37 assists distribution of the compressive force of spring 33. In a preferred embodiment, springs 33, lock nuts 34, angle brackets 38, adjustable bolts 36, and flat bars 37 connect only a portion of vane A to frame 52. This allows freedom of movement and deflection of vane 54.

Figure 5:
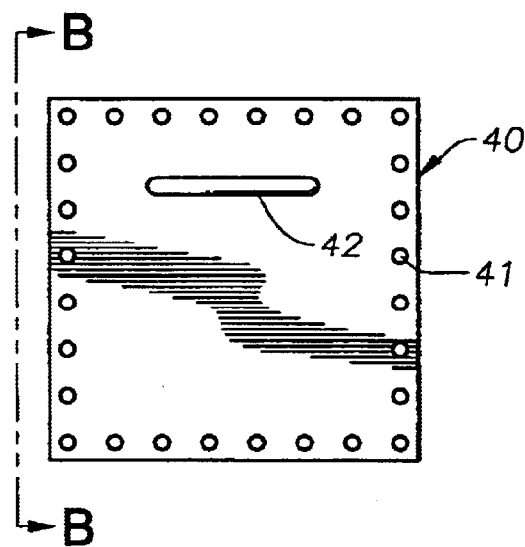
FIG. 5 shows an embodiment of a plate used with the valve assembly.
Figure 6:
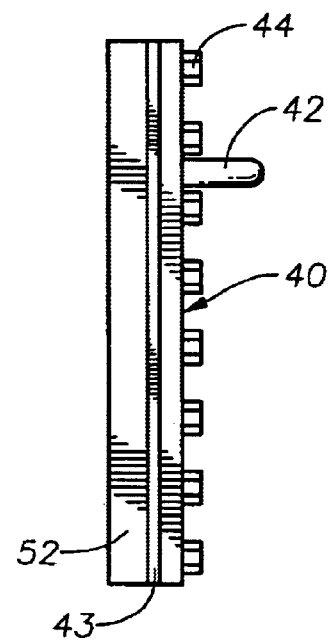
FIG. 6 shows a side view of the embodiment of the plate shown in FIG. 5 taken at plane B—B.

Referring next to FIGS. 5 and 6, there is shown a plate 40 sized to mate with frame 52 and is preferably made from aluminum. Plate 40 is used to cover and seal valve assembly 50 and to make pontoons 16 watertight. Plate 40 is used when it is desired to operate system 10 in the amphibious mode as described in detail below. Plate 40 includes a plurality of holes 41 and a handle 42. Handle 42 allows plate 40 to be quickly and easily manipulated into position or to be completely removed. Fasteners 44, preferably bolts, pass through holes 41 in plate 40 and are threaded into holes 75 in frame 52 to secure and sealingly engage plate 40 to frame 52. As best shown in FIG. 6, a gasket 43 is disposed between plate 40 and frame 52 to seal valve assembly 50. Preferably, gasket 43 is made from neoprene and has a thickness of one-quarter of an inch.

Referring now to FIGS. 2 and 9, in a preferred embodiment, surface portion 11 and submersible portion 12 communicate. This can be accomplished via one or more umbilicals 28. Umbilical 28 can be disposed on, or can be disposed through, support members 26. Similarly, if telescoping member 60 is being used, umbilical 28 can be disposed on, or can be disposed through, telescoping member 60. Umbilical 28 allows control and operational signals to pass between surface portion 11 and submersible portion 12. For example, the operator can steer submersible portion 12 by sending control signals that vary the amount and direction of thrust or track travel applied to each track in system 17, thereby advancing, tuning, or reversing submersible portion 12. Additionally, operational signals can be sent through umbilical 28 to manipulate tool 20 or a camera 100 (shown in FIGS. 1 and 2 and hereinafter described).

Referring again to FIG. 2, system 10 further includes a discharge conduit 85 preferably disposed on extension 13. Discharge conduit 85 removes sand, rocks, and other debris from the area where tool 20 is working. Discharge conduit 85 can work in any number of ways, but a preferable way is to act as a vacuum to suck the sand, rocks, and debris away from the work area of tool 20 and to excrete it away from the work area. Discharge conduit 85 extends toward the water's surface for the discharge of the debris away from the work area.

Figure 7A:
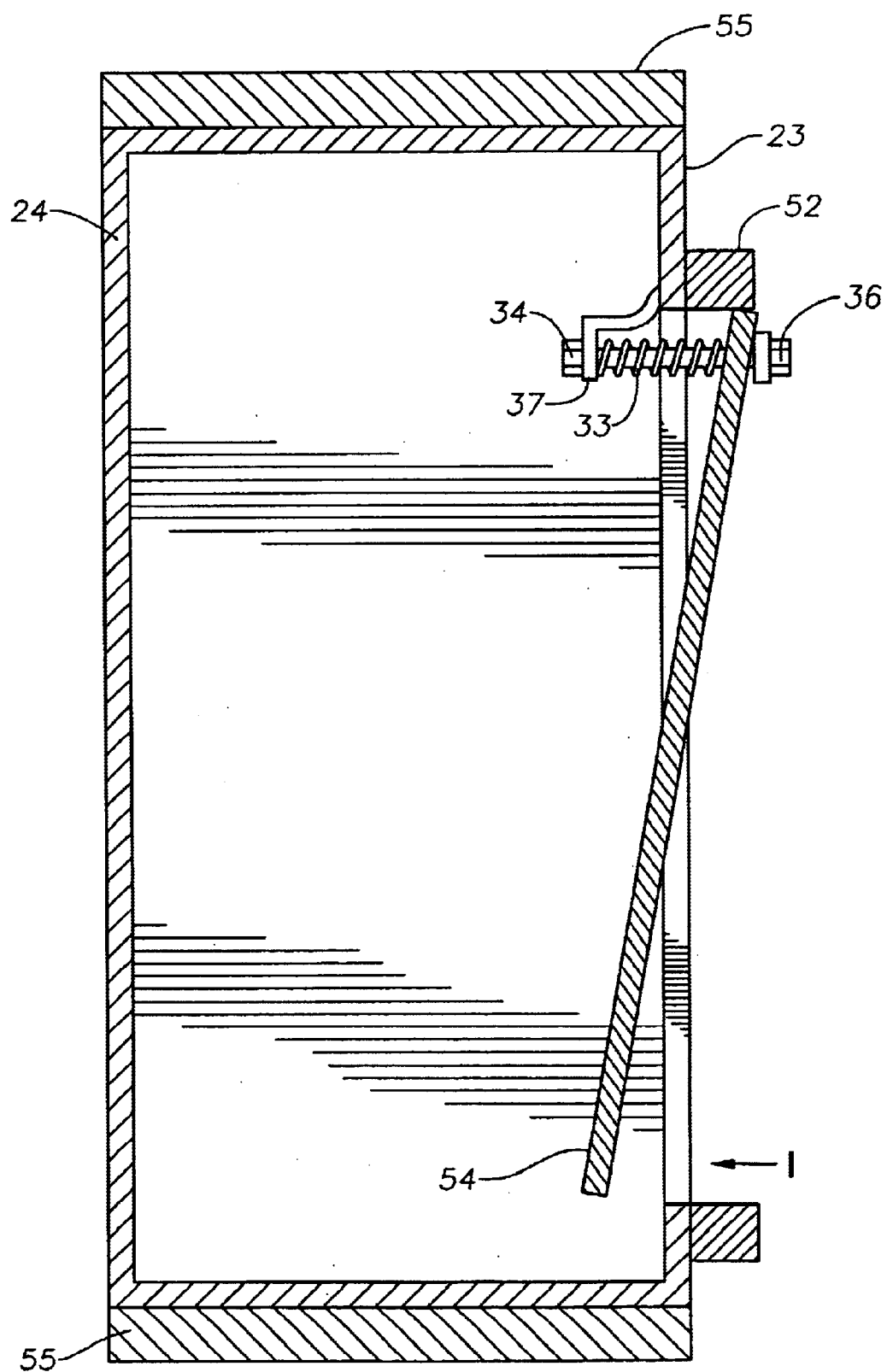
FIG. 7A is a cross-sectional view of an embodiment of the pontoon and valve assembly of the invention showing a vane of the valve assembly deflected inward.
Figure 7B:
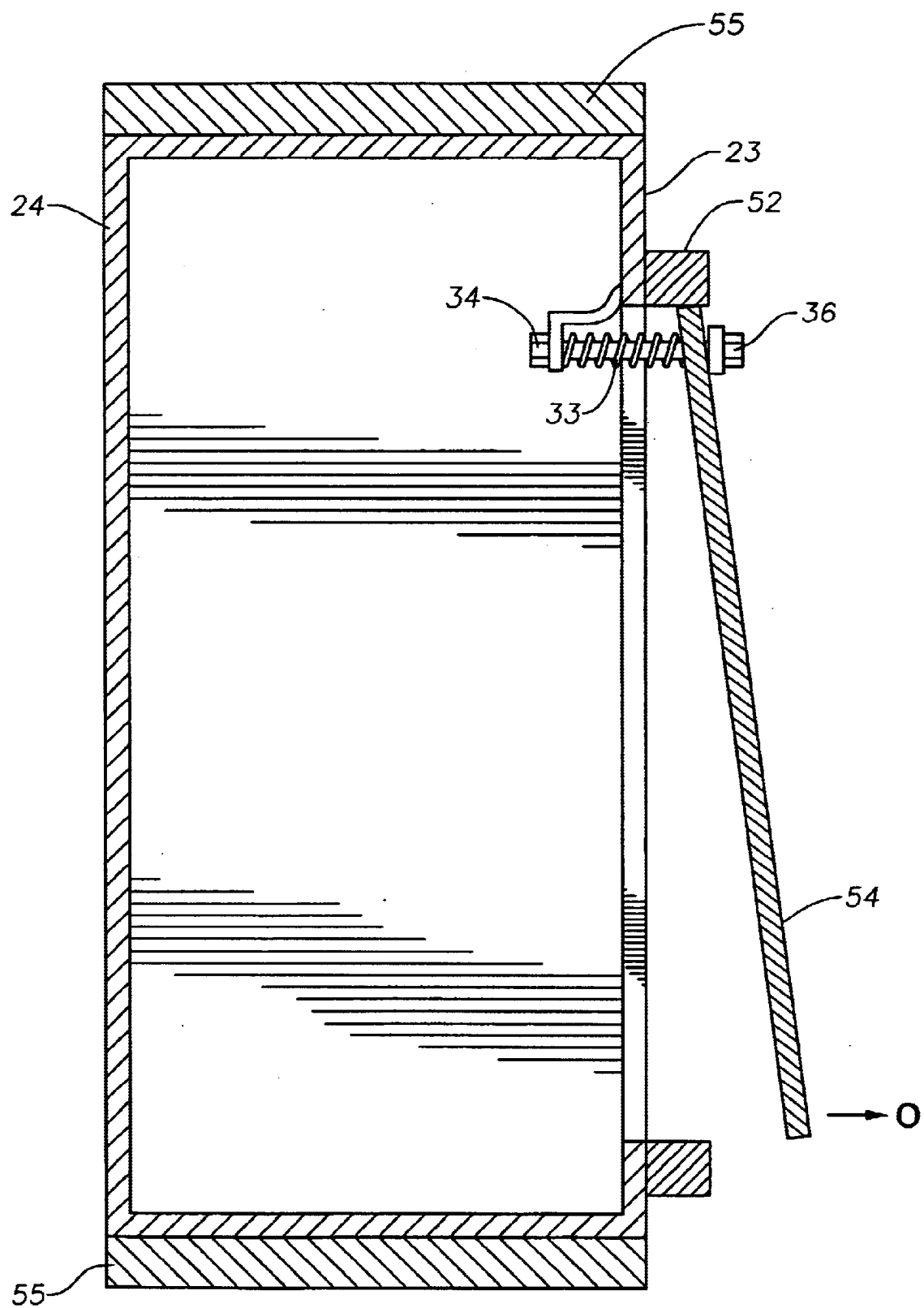
FIG. 7B is a cross-sectional view of an embodiment of the pontoon and valve assembly of the invention showing the vane of the valve assembly defected outward.

Referring now to FIGS. 7A and 7B, there is illustrated the movement and deflection of vane 54. This deflection occurs when system 10 is in the submerged mode (as detailed below), i.e., as system 10 is being moved into or out of a body of water, which can be accomplished in any number of ways. For example, system 10 can be driven into or out of the water body, or system 10 can be lowered into or raised out of the water body. As submersible portion 12 moves or is moved into deeper water, the water pressure outside vane 54 becomes greater than the air pressure inside pontoons 16. At this point, the pressure differential forces vane 54 in the direction of Arrow II shown in FIG. 7A, allowing water to enter pontoons 16. Once the pressure inside pontoons 16 equals the pressure outside pontoons 16, vane 54 moves back to its original, undeflected position (shown in FIG. 4), thereby substantially preventing sand and other sediment or debris from entering pontoons 16. Conversely, as submersible portion 12 moves or is moved into shallower water, the pressure inside pontoons 16 becomes greater than the pressure outside pontoons 16. At this point, the pressure differential forces vane 54 in the direction of Arrow O shown in FIG. 7B, allowing water to escape from pontoons 16. Once the pressure inside pontoons 16 equals the pressure outside pontoons 16, vane 54 moves back to its original, undeflected position (shown in FIG. 4). Therefore, depending on the difference in pressure between inside and outside of pontoons 16, vane 54 can move inward as shown by Arrow I or outward as shown by Arrow O.

Figure 8:
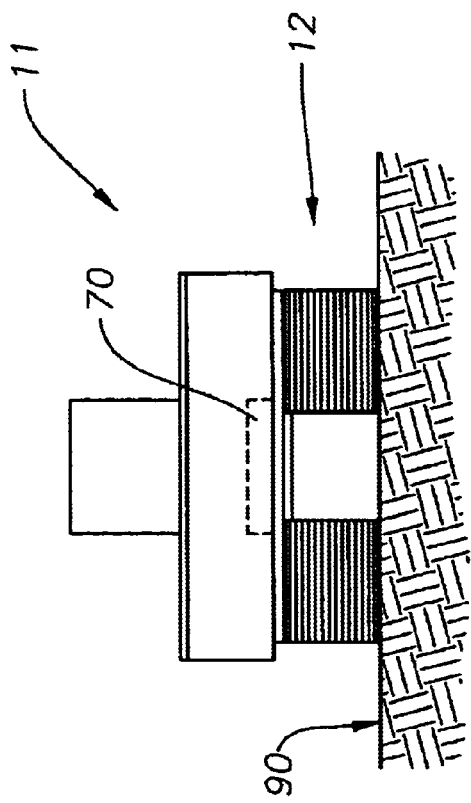
FIG. 8 shows the front view of an embodiment of the invention in the amphibious mode.

Referring next to FIG. 8, amphibious/submersible system 10 is shown in the amphibious mode. In this mode, pontoons 16 provide low ground pressure and/or floatation and form a base for mounting equipment and supporting men or materials. When in the amphibious mode, extension 13 of system 10 is retracted and preferably fits within cavity 70 of surface portion 11. The present invention is not so limited, however, and extension 13 may rest in any suitable position. In the amphibious mode, any number of tasks may be accomplished in the water bed. Additionally in the amphibious mode, the system 10 generates low ground pressure to avoid becoming stuck in soft terrain.

Amphibious/submersible system 10 is shown in the submerged mode in FIGS. 1, 2, and 9. In this mode, surface portion 11 and submersible portion 12 separate. In this mode, submersible portion 12 is capable of working the bed of a body of water at depths that far exceed those worked in the amphibious mode because the extension 13 is capable of extending to various depths. Additionally, at least one still or video camera 100 can be mounted on the submersible portion 12 and/or on the tool 20 to allow the operator to view what is occurring below the surface.

System 10 can be switched from the amphibious mode to the submerged mode (and vice versa) quickly, efficiently, and economically. This is accomplished by use of plate 40. For example, if work needs to be done in deep water, plate 40 is not used (or is removed). Thus, as submersible portion 12 enters the water and the water contacts valve assemblies 50, the pressure outside of pontoons 16 becomes greater than the pressure inside pontoons 16. This pressure differential forces vane 54 inward in the direction of Arrow I in FIG. 7A, thereby allowing water to flow into pontoons 16. As pontoons 16 are filling with water, they reach a point where the weight of the pontoons 16 will be greater than the buoyancy force created by pontoons 16. At this point, pontoons 16 will either remain on or sink to the water bed. Once the water level reaches surface portion 11, a buoyancy force keeps surface portion 11 floating on the surface of the water. As submersible portion 12 enters deeper and deeper water, extension 13 extends. This extension preferably occurs due to the buoyancy force exerted on surface portion 11, but may also occur from hydraulic or other motor means.

When it is desired to switch the system 10 to the amphibious mode, the submersible portion 12 is simply steered or raised out of the water. The pressure differential created between the inside and the outside of pontoons 16 forces vanes 54 outward (as shown by Arrow O in FIG. 7B), thus allowing any water in pontoons 16 to escape. At that point, plate 40, and preferably gasket 43, can be sealingly engaged to frame 52, providing a watertight seal and preventing water or other liquid or debris from entering pontoons 16. This allows pontoons 16, and thus submersible portion 12, to have low ground pressure and to be buoyant. To reverse this process and to return to the submerged mode, the plate 40 can be simply disengaged. Thus, system 10 can quickly, simply, and economically be converted from amphibious mode to submerged mode and vice versa.

At time in the amphibious mode, system 10 may be floating on a body of water. In such times, system 10 can be propelled by the movement of track system 17. In such times, system 10 can alternatively or additionally be propelled by hydraulic propellers, paddle wheels, jet propulsion, or other propulsion systems known in the art.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims that follow, the scope of which shall include all equivalents of the subject matter of the claims.

What is claimed is:

1. A vehicle for amphibious and submersible operation in water having a bed, comprising:
    a first portion capable of floating on the surface of the water;
    a second portion capable of underwater operation and driving engagement with the bed;
    an extension having one end coupled to said first portion and another end coupled to said second portion; and
    at least one valve assembly disposed on said second portion allowing said second portion to submerge while said first portion floats.

2. The vehicle of claim 1, wherein said second portion includes at least one enclosure forming a float with said valve assembly disposed in one side of said enclosure for the ingress and egress of water and air.

3. The vehicle of claim 2, wherein said side includes an aperture covered by a vane in said valve assembly.

4. The vehicle of claim 3, wherein said vane is hinged to move in and out of said aperture.

5. The vehicle of claim 3, further included a removable fluid tight seal for sealing said aperture.

6. The vehicle of claim 1, wherein said valve assembly includes a vane made of ultra high molecular weight polyethylene.

7. The vehicle of claim 1, wherein said valve assembly includes a plate capable of being removeably coupled to a frame on said second portion to provide a watertight seal for said valve assembly when said plate is coupled to said frame.

8. The vehicle of claim 6, wherein said valve assembly further comprises a gasket disposed between said frame and said plate.

9. The vehicle of claim 1, wherein said extension includes a member extending between said first and second portions.

10. The vehicle of claim 9 wherein said member is a ladder.

11. The vehicle of claim 9, wherein said member is a telescoping member.

12. The vehicle of claim 1, further including an umbilical extending between said first and second portions.

13. The vehicle of claim 12, wherein said umbilical is disposed on said extension.

14. The vehicle of claim 12, wherein said umbilical is disposed within said extension.

15. The vehicle of claim 1, further comprising a tool coupled to said second portion.

16. The vehicle of claim 1, wherein said second portion comprises a chassis which couples a plurality of pontoons.

17. The vehicle of claim 16, further comprising a track system disposed about each of said pontoons.

18. The vehicle of claim 1, further including a camera coupled to said second portion.

19. An amphibious vehicle with submersible capacity, comprising:
    a surface portion having a floor;
    a submersible portion having a plurality of pontoons and a chassis coupling said pontoons, wherein each of said pontoons has a side wall with at least one aperture;
    a track disposed around each of said pontoons;
    a closure member hinged on said pontoon and covering said aperture; and
    a coupling member coupling said surface portion to said submersible portion.

20. The vehicle of claim 19, wherein said closure member moves in and out of said aperture in response to a pressure differential across said side wall.

21. The vehicle of claim 19, further including a seal plate to seal off said aperture.

22. The vehicle of claim 21, further comprising a gasket disposed between said seal plate and said side wall.

23. The vehicle of claim 19, wherein said coupling member includes a pair of structural members extending between said portions with braces extending between said structural members.

24. The vehicle of claim 19, wherein said coupling member is a telescoping member.

25. The vehicle of claim 19, further comprising a discharge line disposed on said coupling member.

26. The vehicle of claim 19, further comprising a deck disposed said pontoons.

* * * * *